(12) United States Patent
Hulley et al.

(10) Patent No.: US 7,337,575 B2
(45) Date of Patent: Mar. 4, 2008

(54) BIRD DECOY

(75) Inventors: Andrew Martyn Hulley, Glenrowan (AU); Geoff Anthony Sanders, Glenrowan (AU)

(73) Assignee: NRA FUD, Inc., Fairfax, VA (US)

( * ) Notice: Subject to any disclaimer, the term of this patent is extended or adjusted under 35 U.S.C. 154(b) by 0 days.

(21) Appl. No.: 11/167,919

(22) Filed: Jun. 27, 2005

(65) Prior Publication Data

US 2005/0279005 A1    Dec. 22, 2005

Related U.S. Application Data

(63) Continuation of application No. 10/915,845, filed on Aug. 11, 2004, now abandoned, which is a continuation of application No. 10/384,700, filed on Mar. 11, 2003, now abandoned, which is a continuation of application No. PCT/AU01/01136, filed on Sep. 11, 2001.

(30) Foreign Application Priority Data

Sep. 11, 2000   (AU) .................................... PR0039

(51) Int. Cl.
   *A01M 31/06*   (2006.01)
(52) U.S. Cl. ............................................................ 43/3
(58) Field of Classification Search ...................... 43/2, 43/3
   See application file for complete search history.

(56) References Cited

U.S. PATENT DOCUMENTS

| 1,062,713 | A | * | 5/1913 | Johnson | 43/3 |
|---|---|---|---|---|---|
| 2,313,353 | A | * | 3/1943 | Mills | 43/3 |
| 2,662,327 | A | * | 12/1953 | Petersen | 43/3 |
| 2,763,952 | A | * | 9/1956 | Bruce | 43/3 |
| 3,245,168 | A | * | 4/1966 | Pool | 43/3 |
| 3,401,476 | A | * | 9/1968 | Trumbo | 43/3 |
| 4,251,937 | A | * | 2/1981 | Curley | 43/3 |
| 4,435,913 | A | * | 3/1984 | Messina | 43/3 |
| 4,972,620 | A | * | 11/1990 | Boler | 43/3 |
| 5,293,709 | A | | 3/1994 | Cripe | 43/3 |
| 5,595,012 | A | | 1/1997 | Coleman | 43/3 |
| 5,608,983 | A | | 3/1997 | Adams | 43/3 |
| 5,682,702 | A | | 11/1997 | McKnight et al. | |
| 5,822,907 | A | | 10/1998 | Lukey | 43/3 |
| 6,082,036 | A | | 7/2000 | Cripe | |
| 6,115,953 | A | | 9/2000 | Wise | |
| 6,216,382 | B1 | | 4/2001 | Lindaman | |
| 6,640,413 | B1 | * | 11/2003 | Martin et al. | 29/525.01 |
| 2002/0073598 | A1 | * | 6/2002 | Wright | 43/3 |
| 2003/0226307 | A1 | * | 12/2003 | Hulley et al. | 43/2 |

FOREIGN PATENT DOCUMENTS

CA   2275780   6/1999

* cited by examiner

*Primary Examiner*—Kurt Rowan
(74) *Attorney, Agent, or Firm*—Casimir Jones, S.C.

(57) ABSTRACT

A collapsible decoy 10, including two generally planar side body panels 11, 12 allowing the decoy 10 to be collapsed into a substantially flat configuration and which are splayed when in the erected position, a head and neck portion 14 connected to at least one of the side body panels 11, 12, and a means for retaining the side body panels 11, 12, when in use, in the erected position.

10 Claims, 5 Drawing Sheets

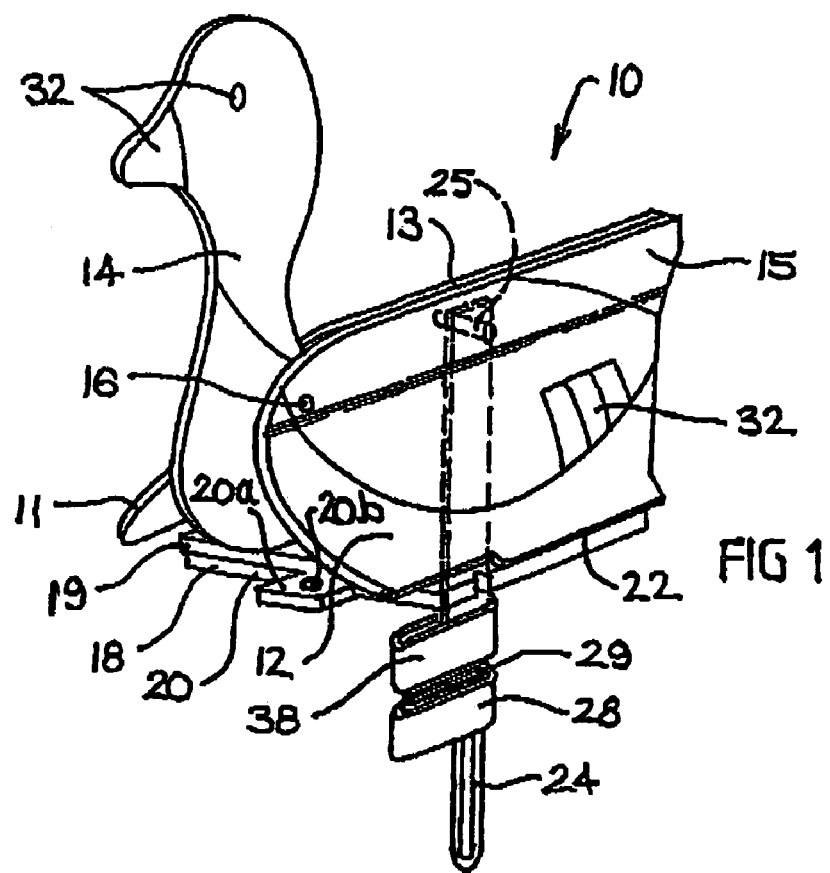
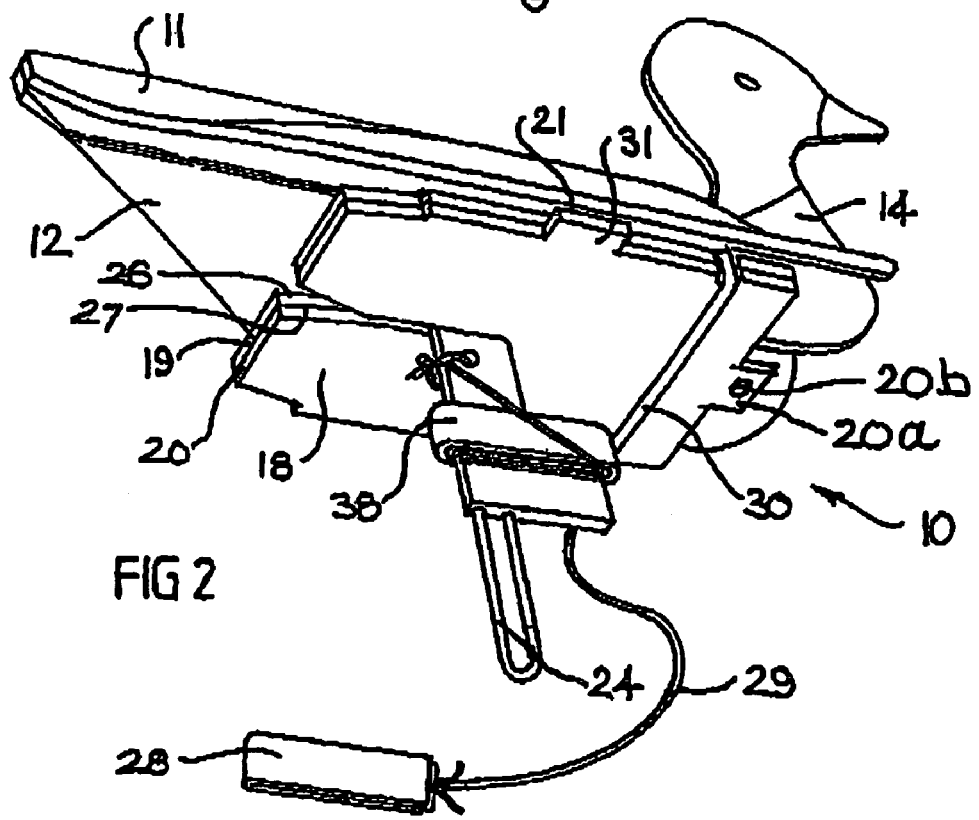

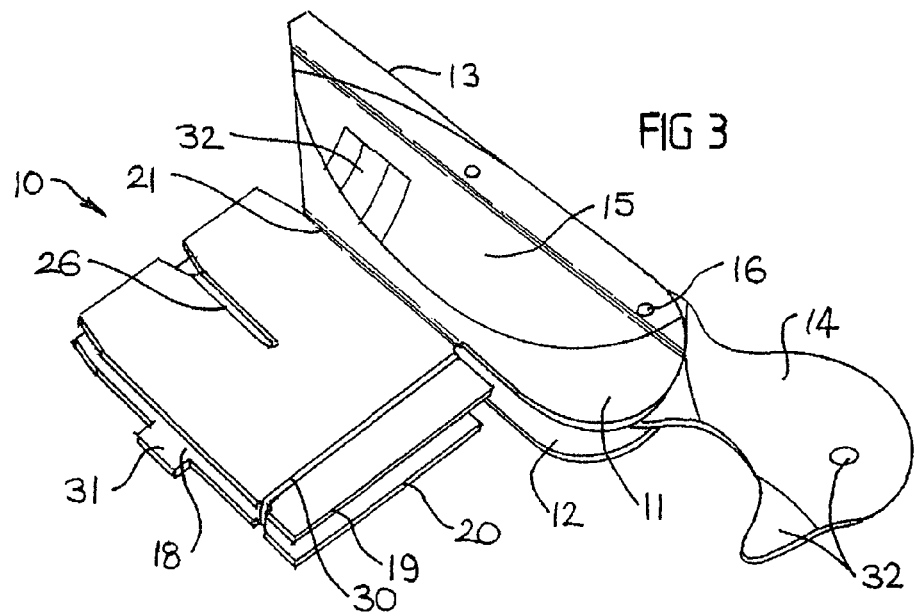
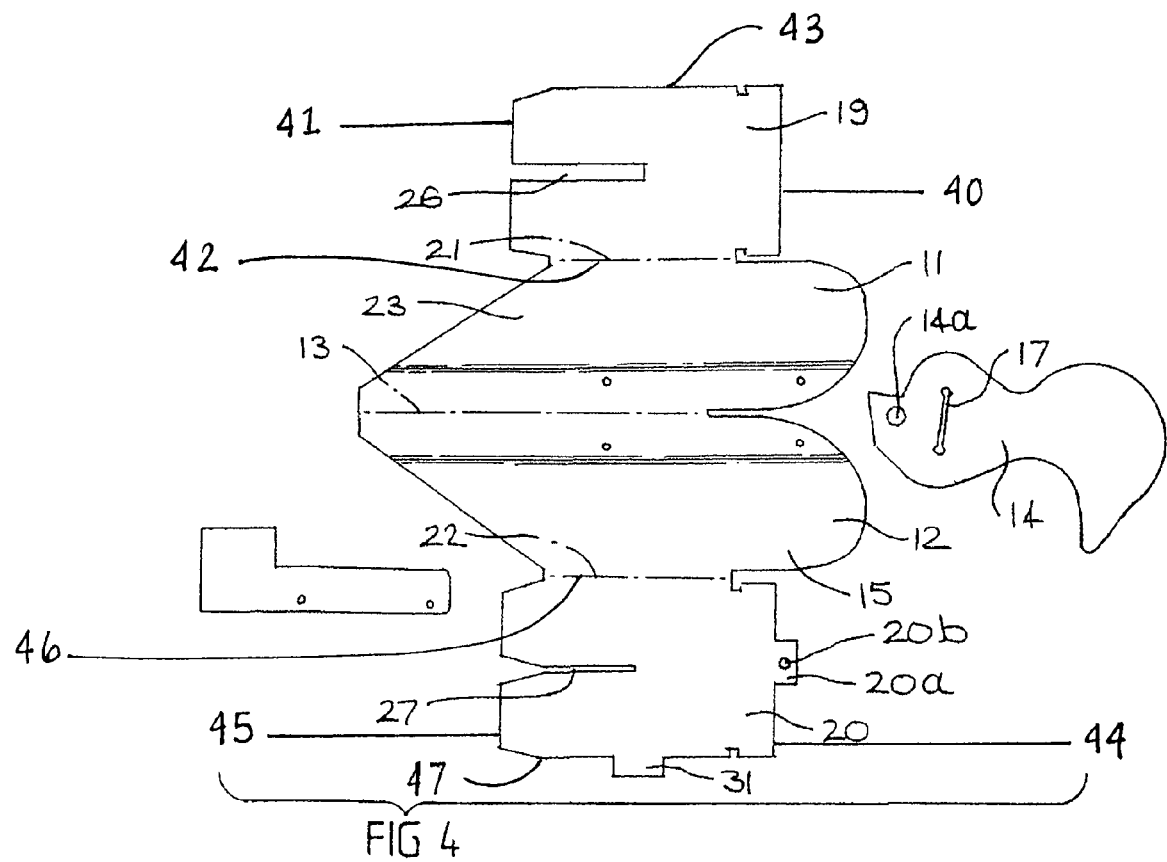

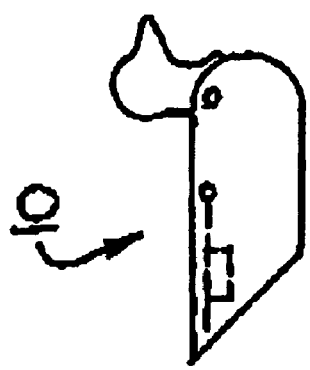
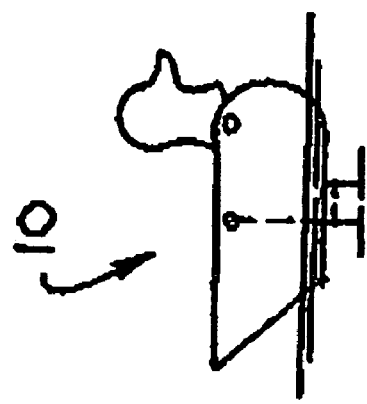
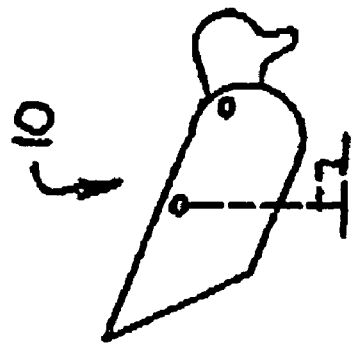
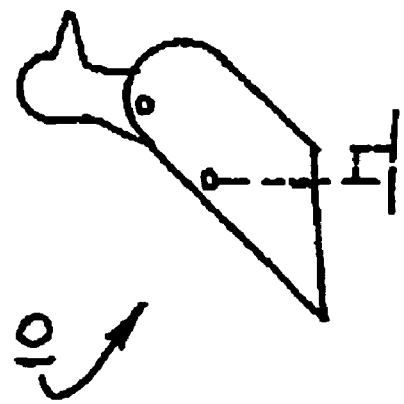
FIG 11d
FIG 11c
FIG 11b
FIG 11a

BIRD DECOY

RELATED CASES

This is a continuation of application Ser. No. 10/915,846, filed Aug. 11, 2004 which is a continuation of application Ser. No. 10/384,700, filed Mar. 11, 2003, which is a continuation of PCT International Application No. PCT/AU01/01136 filed Sep. 11, 2001, which claims priority to Australian Patent Application PR 0039 filed Sep. 11, 2000, all of which are incorporated herein by reference.

FIELD OF THE INVENTION

This invention relates generally to a bird decoy and, more particularly, to a bird decoy used by hunters to attract game. It is to be appreciated, however, that this invention could also be used by bird watchers, environmental agencies and the like to assist in studying and capturing game.

The term "game" as used in this specification is understood to include but not be limited to birds such as game birds

BACKGROUND OF THE INVENTION

Game are attracted to decoys representing their own species, and so hunters often use a specifically styled decoy to attract the species represented by the decoy.

One decoy type is that of a moulded three-dimensional decoy. This decoy type, due to its three dimensional nature, can be manufactured such that it is looks sufficiently realistic to attract game. However, this type of decoy is relatively bulky. This is undesirable, because hunters often require the use of relatively a large number of decoys in the one area to maximise the chances of attracting game. In this respect, as many as 50 to 100 decoys can be required. Clearly, however, only a few of these decoys could be carried by a hunter at the one time, meaning that excessive time and energy would be wasted by a hunter when moving or carrying a large number of these decoys. Also, in relative terms, these decoys tend to be expensive to manufacture.

Another decoy design is in the form of a two-dimensional silhouette, with a representation of the game provided on either side. While this design is lightweight and easy to transport and store due to its two dimensional design, it is a less realistic decoy compared to the previously described three-dimensional type, and therefore has proven less effective in use than three-dimensional decoys. Also, the functionality of this design is limited because it is designed for use on land, and is not designed for use on water. In this respect, a decoy which is capable of being used on waterways, such as lakes, swamps, rivers and the like would be particularly advantageous as birds are naturally attracted to water to feed and rest.

The above discussion of the background to the invention herein is included to explain the context of the invention. This is not to be taken as an admission that any of the material referred to was published, known or part of the common general knowledge in Australia as at the filing date of the application.

SUMMARY OF THE INVENTION

It would be desirable to provide a realistic decoy which is easy to handle and carry. It would also be desirable to provide a decoy which floats such that it can be used on both land and water.

According to one aspect of the present invention there is provided a collapsible decoy, including two generally planar side body panels allowing the decoy to be collapsed into a substantially flat configuration and which are splayed when in the erected position, a head and neck portion connected to at least one of the side body panels, and a means for retaining the side body panels, when in use, in the erected position.

Most preferably the decoy is buoyant.

In a most preferred form, the decoy includes a base. It is preferable that the base has sufficient buoyancy to enable the decoy to float, to thereby simulate a bird floating on the surface of water. However, it is to be appreciated that the decoy may include separate flotation devices which provide the decoy with sufficient buoyancy independent of, or in conjunction with, the buoyant base.

The material from which the side body panels and base are constructed should be chosen to provide the preferred physical characteristics for the decoy, including stiffness, durability, strength, light-weight and non-absorbent to liquids. Stiffness is desirable to enable the various components to retain their desired shape. Durability and strength are desirable so that the decoy can withstand the harsh treatment to be expected in outdoor, field, simulation or hunting environments. Desirably the decoy is light-weight enabling the decoy to be comfortably carried. To assist the decoy in remaining floatable, the decoy is preferably non-absorbent to liquids.

Preferably, the side body panels and/or base are constructed from laminated plastic sheeting, which includes self contained air pockets, bubbles, or a honeycomb pattern, or similar layer welded onto at least one side, and preferably the inner side, of the sheeting. Such an arrangement could thereby provide a self-contained water-tight compartment on at least one side of the sheeting.

Alternatively, the base and/or side walls could be manufactured from a buoyant foam.

One advantage of using a modified sheeting as described in the two preceding paragraphs is that the sheeting can be manufactured in an at least partially watertight state. This enables the use of automatic cutting machines for cutting of the decoy forms that do not have heat sealing capabilities, thereby resulting in reduced decoy manufacturing costs. Whatever material is used, the various body parts could be produced by stamping, cutting, moulding or the like.

In another form, the side body panels and base could constructed from plastic sheeting. One particularly desired material to construct the side body panels and base from is plastic corrugated sheeting with opposed liners that define the face surfaces separated by parallel flutes that extend at least partially across the sheet. Preferably the cavity provided in the base between the surfaces of the corrugated sheeting is sealed to assist in the buoyancy of the decoy.

Another desired material from which to construct the side body panels and base is similar to the aforementioned corrugated sheeting, but includes a second set of parallel flutes that are provided at an angle other than parallel, and preferably tangentially, to the first set of flutes. The two sets of flutes would be intermeshed to define a plurality of separate and airtight cavities within the sheeting. This material provides the advantage of being able to be manufactured in an at least partially watertight manner.

Preferably, the planar side body panels and the base are interconnected to assist in the ease of initially assembling the decoy, as well as to assist in collapsing and erecting the decoy when in use. In one particularly preferred form, the side body panels and the base are integral (ie one-piece).

This obviates the step of connecting the base to the side body panels during assembly. It also results in fewer parts needing to be manufactured. Preferably, the side body panels are sealed/watertight. The side body panels could be sealed, or made watertight, in a similar manner to the base.

In one form, the integral side body panels and base are connected along lines of relative weakness provided in the sheeting, which act as integral hinges between the side body panels and the base. This obviates the need of incorporating separate hinges between the side wall panels and the base.

The applicant envisages that the head and neck could be an integrated unit. However, it is to be appreciated that other arrangements could also be adopted. Preferably, the head and neck portion are of a two-dimensional silhouette arrangement, which is attached to at least one of the side body panels or other decoy body portion. However, it is to be appreciated that, if desired, the head and neck portion could adopt a three-dimensional form. Indeed the head and neck (as well as the outer body surfaces) could be moulded to represent a more bird-like product.

Preferably, a means for altering the position of the head and neck relative to the side body panels is provided. In this way the decoy can be altered to assume any one of a variety of forms. In one form, the altering means includes a pivotal connection between the head and neck portion and the side body panels (or other portion of the decoy body). The pivotal connection could take one of any number of forms, including that of a rivet (or other fastener). In this form it is also desirable to provide an elongated groove in one of the head and neck portion or the decoy body about the pivot, such that the head and neck portion can be moved longitudinally well as pivotally relative to the body. In this way the decoy could be provided with a range of neck and head positions simulating various stances of the bird being emulated.

Preferably, the side body panels and the head and neck portion are adorned with markings such that they resemble the bird species being represented. The markings could be provided by way of stencils, or could be painted on. However, it is currently envisaged that the markings will be in the form of a reproduced image of the species being represented, which will be printed on the visible surfaces of the decoy.

Preferably, the base colour of the sheeting used to manufacture the decoy is chosen such that the density of markings required to be applied to the surfaces is minimised. Thus it is preferable to choose a base colour for the sheeting in line with the predominant colour of the species being emulated.

The side body panels and the head and neck portion could desirably be provided with a matt textured surface, such as a flocked or similar surface, in which an upstanding fabric-type finish is provided. Such a surface provides a generally much more realistic decoy, partly because it causes water on the decoy to bead in a manner akin to water beading on bird feathers.

In a preferred form the decoy includes a keel (or pedestal) extending downwards from the base of the decoy. This provides stability to the decoy when floating on a body of water. By choosing the appropriately sized and shaped keel, and by appropriately positioning the keel relative to the body of the decoy, the decoy can be caused to move in a realistic manner in response to wind, ripple effects and the like on the water surface. Preferably, the keel also assists in providing a decoy that is self-righting when used on water.

In one form the keel is pivotally connected to the side body panels, enabling the keel to be pivoted into a slot provided in the base when the decoy is in the erected configuration. This enables the keel to also function as a means for retaining the decoy in the erected configuration.

Also, by pivoting the keel relative to the decoy, it is possible to adjust the movement of the erected decoy in response to wind, ripples, waves and other environmental factors, when floating on a pond, lake, swamp or the like.

The decoy has, so far, been described in the context of use on water. However, it is to be appreciated that the decoy could also be used on land. In this respect, the base of the decoy could be placed directly on the ground. Alternatively, the keel could be partially inserted into the ground so as to act as a support for the decoy, thereby enabling the decoy to assume a variety of stances, including a pedestal or standing position. This is possible by virtue of the keels' pivotal attachment to the decoy, enabling the decoy to be pivotally adjusted relative to the keel.

In one form the decoy includes an anchoring means to prevent the decoy floating away in response to environmental forces such as wind and current when in use on the surface of water. In its simplest form, the anchoring means could include a weight which is attached to the keel by a length of string, fishing line or the like. The weight and string could be stored in a compact manner on or within the decoy for storage and transport.

Each decoy could, if desired, include an anchoring means. Also, it is to be appreciated that a single anchoring means could be provided for anchoring a number of decoys in a particular area.

However, it is to be appreciated that decoys could be sold with or without an anchoring means. It is envisaged that anchoring means could be sold separately to the decoy.

Indeed, it may be that decoys replicating certain species, for example waterfowl, may include an anchoring means, whereas certain other species may not include an anchoring means.

Irrespective of whether or not decoys are sold with an anchoring means, the decoys could include an aperture or other anchoring point to enable the easy connection of an anchoring means, if desired.

The aperture or other anchoring point could be placed at any suitable location on the decoy, including on the keel, or on the body of the decoy, such as on a side body panel(s), or on the base.

In one possible form, the decoy includes a biasing means for biasing the decoy into the erected and collapsed configurations. The biasing means could be in the form of an elastic band which extends around two separate portions of the base, with the base portions being connected to the lower edges of respective body side panels. The biasing means could also adopt any other suitable form.

In an alternative form, the decoy includes a locking mechanism for retaining the decoy in the erected configuration. The locking mechanism could be integrated into the base portions. In this form, the decoy could be retained in the collapsed configuration by, for example, wrapping the string from the decoy's anchoring means around the base portions. This obviates the need for a separate biasing means.

It is to be appreciated that the decoy could be manufactured in a variety of shapes, styles and sizes so as to represent any one of a number of species.

The various components of the decoy, including body parts, fasteners and the like should preferably be rust-proof (and weather-proof) since the decoy is primarily designed for use outdoors, and particularly on water.

It is envisaged that the decoys could be sold already assembled. This is desirable because it obviates the need for the purchaser to assemble the product prior to use.

However, is to be appreciated the present invention is also directed to a kit from which to construct a decoy, since the applicant envisages that the decoy could be sold in kit-form to be assembled by the purchaser. Thus, according to another aspect of the present invention, there is provided a kit from which to construct a collapsible decoy, including two side body panels, a head and neck portion, means for connecting the head and neck portion to at least one of the side body panels, and a means for retaining the assembled decoy in the erected configuration.

Preferably, the kit includes a base.

Preferably, the side body panels and base are integrated.

Preferably, the kit also includes the afore mentioned additional components, such as fastening means in the form of rivets, anchor, keel, string to attach the anchor to the keel, and the like, such that the kit includes sufficient components to fully assemble the decoy.

The decoys could be sold singularly or in multiples (i.e., 6, 12 etc), irrespective of whether they are sold already assembled or in kit form.

The applicant also perceives other uses for the decoy. It is to be appreciated that the decoy could be used both indoors and outdoors as an advertising or promotional hoarding, or for decorative use.

BRIEF DESCRIPTION OF THE FIGURES

It will be convenient to hereinafter describe preferred embodiments of the invention with reference to the accompanying drawings. The particularity of the drawings is to be understood as not limiting the preceding broad description of the invention.

In the drawings:

FIG. 1 is an upper perspective view of one preferred embodiment of a decoy according to the present invention when in the erected state.

FIG. 2 is a lower perspective view of the decoy of FIG. 1, but with the anchor removed from the keel.

FIG. 3 is a perspective view of the decoy of FIG. 1 when in the collapsed state.

FIG. 4 is a plan view of the various body parts of the decoy of FIG. 1, when disassembled.

FIGS. 11*a* to 11*d* are side views of various decoy postures of the decoy in FIG. 1

DETAILED DESCRIPTION

Figure 10:
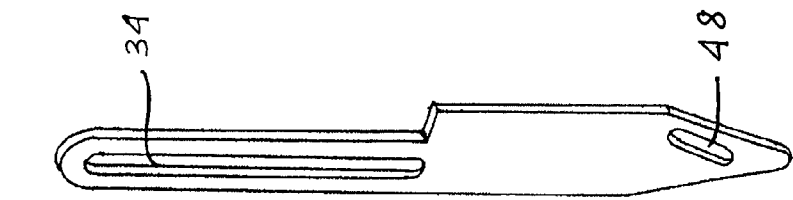
FIG. 10 is a perspective view of a further keel design.

Referring to FIGS. 1 to 3, a decoy 10 is illustrated. The decoy 10 includes side body panels 11 and 12. The side body panels 11 and 12 are integrally connected along an upper edge 13. The upper edge 13 of the side body panels 11 and 12 is provided in the form of a line of relative weakness, thereby acting as an integrated hinge. This enables the side body panels 11 and 12 to be repeatedly moved from the collapsed configuration (as illustrated in FIG. 3) to the erected, splayed configuration (as illustrated in FIGS. 1 and 2), and vice versa.

The decoy 10 also includes a head and neck portion 14. The head and neck portion 14 is pivotally connected to the body 15 of the decoy 10 via a rivet 16. This enables the head and neck portion 14 to assume a variety of orientations relative to the body 15, thereby enhancing the realism that can be provided by the decoy 10. The head and neck portion 14 also includes a slot 17 (see FIG. 4). The slot 17 enables the head and neck portion 14 to be moved longitudinally relative to the body 15 of the decoy 10, thereby further enhancing the realism of the decoy 10, by increasing the number of possible decoy postures.

The decoy 10 includes a base 18 in the form of two flaps 19 and 20 integrally attached to the lower edges 21 and 22 of the respective side body panels 11 and 12. The integral attachments between the flaps 19 and 20 and the respective side body panels 11 and 12 are in the form of integrated hinges, such that the flaps 19 and 20 can be repeatedly moved from an erected state (see FIGS. 1 and 2) to a collapsed state (see FIG. 3).

Thus, it is to be appreciated that the side body panels 11 and 12 and the flaps 19 and 20 are all formed from the one piece of sheeting 23 (see FIG. 4). This provides time savings when assembling the decoy 10, since the side body panels 11 and 12 and flaps 19 and 20 do not require connection to one another when initially assembling the decoy 10. FIG. 4. shows: a first base panel 19 with a front edge 40, a back edge 41, a first edge 42 and a second edge 43; a second base panel 20 with a front edge 44, a back edge 45, a first edge 46 and a second edge 47; a first side panel with a lower edge 21; and a second side panel with a lower edge 22.

Flap 20 includes a tab 20*a* including an anchoring point in the form of an aperture 20*b*. The aperture 20*b* is for the connection of an anchoring means. The tab 20*a* and aperture 20*b* are illustrated in FIGS. 1, 2 and 4, but not in FIG. 3.

The sheeting 23 and the head and neck portion 14 are constructed from corrugated sheeting. However, it is to be appreciated that other forms of sheeting could also be used.

The flaps 19 and 20 are made buoyant by sealing the space between the double walls of the corrugated sheeting. Sealing could be via a heat seal or fusion weld (not illustrated) along the edges of the template as the blank is punched out of the plastic sheet during manufacture. This enables the decoy 10 to float on the surface of water. It is to be appreciated, however, that other means could also be used to seal the space between the walls of the sheeting, including the use of sealant. Indeed, it is preferred to use other forms of sheeting 13 such as foam sheeting or laminated plastic sheeting, which do not require a separate sealing step.

The decoy 10 is provided with a keel 24. The function of the keel 24 is to, inter alia, provide stability for the decoy 10 when placed on water. The keel 24 is positioned relative to the decoy body 15 such that the decoy 10 ideally mimics the movements on water of the species it is designed to replicate. The keel 24 is pivotally attached to the inside of the body 15 by a fastener in the form of a rivet 25.

The flaps 19 and 20 are provided with slots 26 and 27 which, when the decoy is in the erected configuration, can receive the keel 24. The keel 24 and slots 26 and 27 therefore function to retain the decoy 10 in the erected configuration.

When it is desired to collapse the decoy 10, such as for transporting, the keel 24 is pivoted out from the slots 26 and 27 in the flaps 19 and 20. This enables the decoy 10 to be collapsed substantially flat.

The keel 24 also provides an alternative means to connect an anchoring means in the form of an anchor 28, to prevent the decoy 10 being undesirably moved across the water surface by wind, water currents and the like. The keel 24 is attached to the anchor 28 via a nylon string 29. The anchor 28 is shaped such that it can be received on the end of the keel 24 for carrying or storing the decoy 10. The keel 24 includes a weight 38.

A biasing means is provided in the form of an elastic band 30. The elastic band 30 biases the decoy 10 into both the erected and collapsed configurations, thereby assisting in the relatively quick and simple erection and collapsing of the decoy 10. The flap 20 is provided with a tab 31 to enable the user to transform the decoy 10 from the erected to collapsed configurations and vice versa.

The visible surfaces of the decoy 10 are provided with an illustration 32 of the species being replicated. In the illustrated embodiment, the illustration 32 is in the form of a painted reproduction of the species being replicated. However, preferably, the illustration 32 would be in the form of an image of the species being emulated.

While the decoy 10 of the present invention is designed primarily for use on water, it is to be appreciated that it could also be used on land, either by laying the base 18 on the surface of the ground or by inserting the downwardly directed keel 24 into the surface of the ground to support the decoy 10. In this configuration, as the keel 24 is pivotally attached to the decoy 10, a variety of stances can be obtained from the decoy 10.

FIG. 4 illustrates the various panels of the decoy prior to assembly. The decoy could be sold in this form, such that the purchaser would be required to assemble the decoy. The head and neck portion 14 (or any other suitable portion) includes an aperture 14a, which can be used to attach a hook or loop for carrying the decoy 10.

Figure 5:
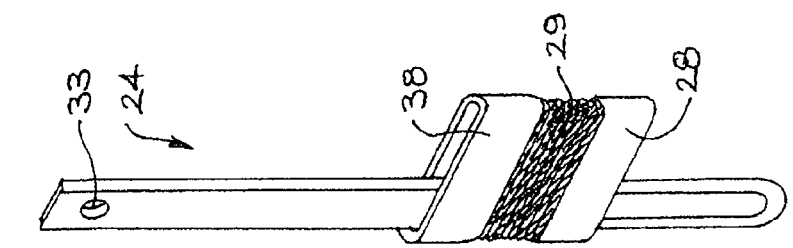
FIG. 5 is a perspective view of the keel and anchor of the decoy illustrated in FIG. 1.

FIG. 5 illustrates the keel 24 (i.e., pedestal) of the decoy in FIG. 1. An aperture 33 is provided to accommodate the rivet 25 (i.e., pivot)(see FIG. 1), and it is this pivot/aperture arrangement that allows the keel 24 to pivot relative to the decoy body 15.

An anchoring means including an anchor 28 and string 29 are illustrated in the stored configuration on the end of the keel 24. The string 29 is illustrated as being connected to the keel 24. However, it is to be appreciated that the string 29 could instead be connected via the aperture 20b provided in the tab 20a.

Figure 6:
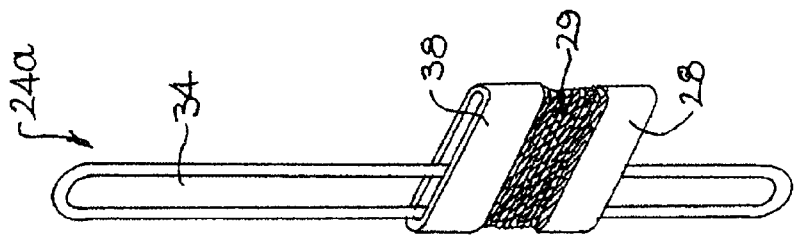
FIG. 6 is a perspective view of an alternative keel and anchor design.
Figure 14:
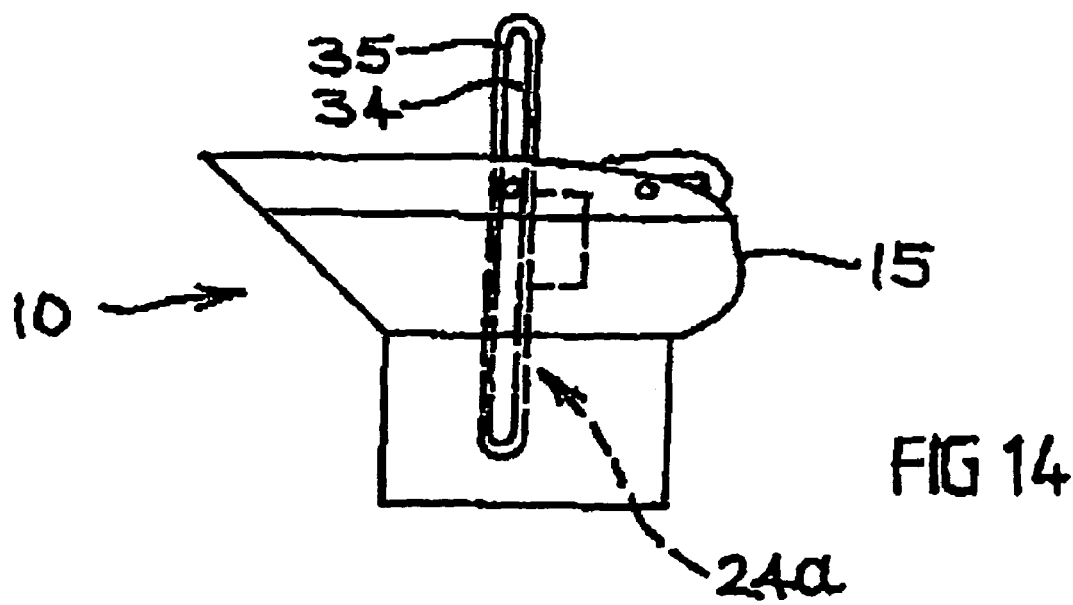
FIG. 14 is a side view of a second embodiment of a decoy according to the present invention when in the collapsed configuration.

FIGS. 6 and 14 illustrate a second keel configuration. Unlike the keel 24 of FIG. 5, the keel 24a of FIG. 6 includes a slot 34 in place of the aperture 33. The slot 34 is provided for slidingly accommodating the rivet 25. This enables the keel 24a to be displaced relative to the decoy body 15, as illustrated in FIG. 14.

Figure 13:
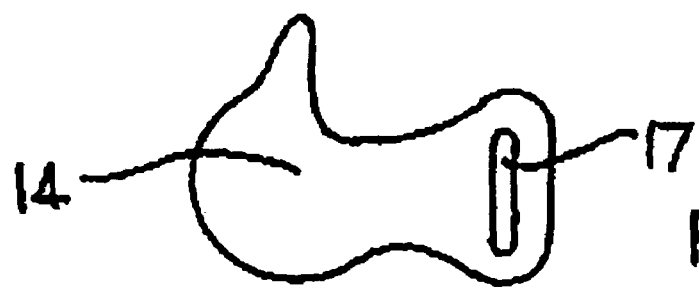
FIG. 13 is a side view of a second embodiment of the decoy head and neck portion.

Referring to FIG. 14, the slot 34 can be used as a carrying loop 35, in place of the carrying aperture 14a (see. FIG. 4). Using the loop 35, instead of the aperture 14a, for carrying the decoy 10 is advantageous because (i) the decoy 10 is carried in a horizontal position, (ii) the aperture 14a is made redundant, as illustrated in FIG. 13, (iii) the keel 24a is stored in a more secure position internally within the decoy body 15, towards the top of the body 15, compared with the keel 24 of FIG. 1, and (iv) by pushing the keel 24a horizontally forward when the decoy 10 is in it's erected state, a new position is achieved of a bird at rest, that can be placed on the ground or water's edge (see FIG. 11d)

Figure 12:
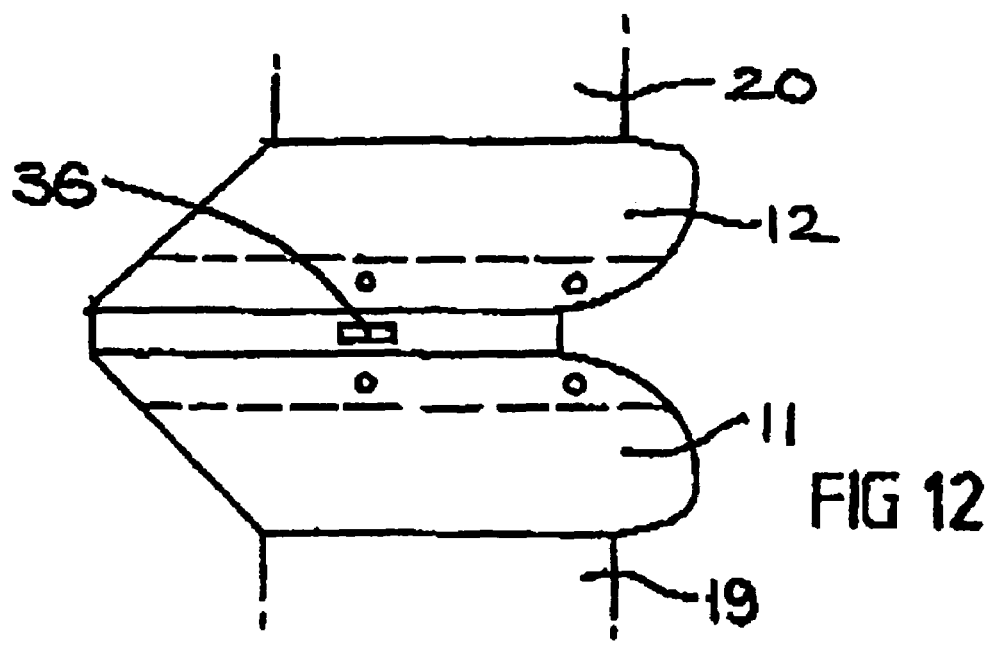
FIG. 12 is a top view of a second embodiment of the decoy body, for use with any one of the keels illustrated in FIGS. 6 to 10.

To accommodate the keel 24a, the decoy body 15 of FIG. 1 is modified to include an aperture 36, as illustrated in FIG. 12. This enables the loop 35 to extend upwardly through the decoy body 15.

Figure 7:
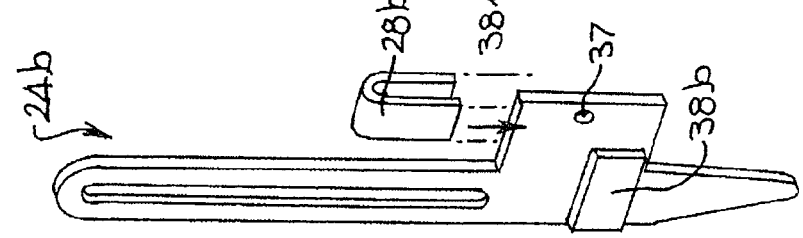
FIG. 7 is a perspective view of yet another keel and anchor design.

The keel 24b of FIG. 7 is similar to the keel 24a illustrated in FIG. 6, except for the configuration of the weight 38b and anchor 28b. The keel 24b includes an aperture 37 for attaching the anchor 28b via string (not illustrated). The weight 38b is crimped onto the keel 24b.

Figure 8:
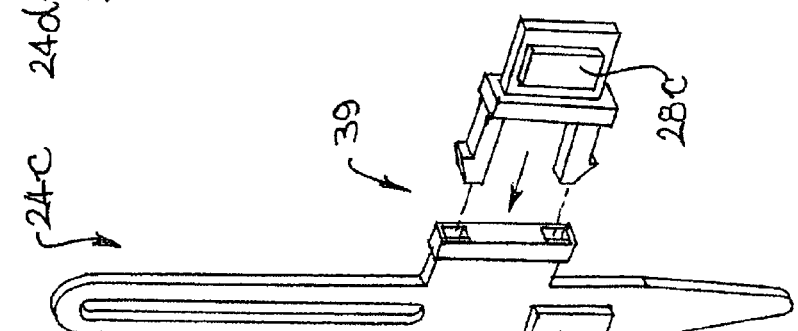
FIG. 8 is a perspective view of a further keel and anchor design.

The keel 24c of FIG. 8 is also similar to the keel 24a illustrated in FIG. 6, except for the configuration of the weight 38c and anchor 28c. The anchor 28c is attached to the keel 24c via string (not illustrated). The anchor 28c is removably connected to the keel 24c via a clip 39. The keel 24c is injection molded.

Figure 9:
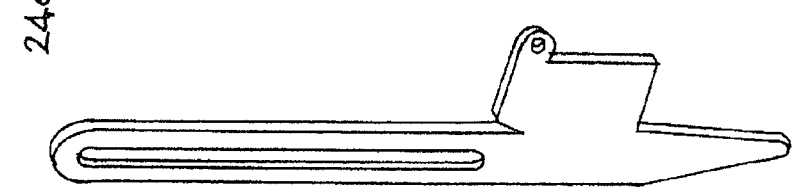
FIG. 9 is a perspective view of a further keel design.

FIGS. 9 and 10 illustrate further keel configurations 24d and 24e, respectively.

The keels 24a to 24e of FIGS. 6 to 10 enable the decoy 10 to adopt any one of the stances of FIGS. 11a to 11d. FIG. 11a illustrates the decoy 10 in an erected or standing position. FIG. 11b illustrates the decoy 10 in a feeding position. FIG. 11c illustrates the decoy 10 when floating. It is to be appreciated that, at least when in the configuration illustrated in FIG. 11c, the decoy is most desirably self-righting in the event that wind, waves or other forces up-end the decoy. FIG. 11d illustrates the decoy 10 when placed on ice, on the ground or on the water's edge.

Decoys made in accordance with the present invention are relatively inexpensive to manufacture and are lightweight due to being made predominantly from plastic sheeting.

Decoys made in accordance with the present invention are relatively easy to transport and store due to their ability to be collapsed when not in use.

Furthermore, unlike many existing decoy designs, the decoy according to the present invention is quickly and easily erected and collapsed in the field. This is, in part, due to the fact that the body, base, head and neck portion and keel remain connected as a single unit, irrespective of whether the decoy is in the erected or collapsed configuration, and, in part, due to the simple erection and collapsing procedure of the decoy.

It is understood that various alterations, modifications and/or additions may be introduced into the construction and arrangement of the parts previously described without departing from the spirit or ambit of this invention.

The invention claimed is:

1. A decoy, comprising:
    a) a first base panel having a first edge, a second edge, a front edge, and a back edge, said back edge comprising a slot;
    b) a first side panel having an upper edge and a lower edge, wherein said first side panel lower edge is flexibly connected with said first base panel first edge;
    c) a second base panel having a first edge, a second edge, a front edge, and a back edge, said back edge comprising a slot;
    d) a second side panel having an upper edge and a lower edge, wherein said second side panel lower edge is flexibly connected with said second base panel first edge, wherein said first base panel is configured to fold over said second base panel such that said first base panel back edge slot is aligned above said second base panel back edge slot, and wherein said second side panel upper edge is flexibly connected with said first side panel upper edge;

e) a pedestal pivotally connected to at least one of said side panels, said pedestal comprising a slot, wherein said first base panel back edge slot aligned above said second base panel back edge slot is configured to receive said pedestal at a desired angle at said pedestal pivot on said side panel, and wherein said side panel is configured to be positioned at a desired length along said slot in said pedestal; and f) a head and neck portion pivotally connected to at least one of said side panels, said head and neck portion comprising a slot, wherein said head and neck portion is configured to be positioned at a desired angle at said head and neck pivot on said side panel, and wherein said side panel is configured to be positioned at a desired length along said slot in said head and neck portion.

2. The decoy of claim 1, wherein said decoy is buoyant.

3. The decoy of claim 2, wherein said decoy further comprises a buoyant foam.

4. The decoy of claim 2, wherein said decoy is buoyant in the absence of a floatation device.

5. The decoy of claim 1, wherein said decoy is self-righting in water.

6. The decoy of claim 1, wherein said decoy is collapsible into a substantially flat configuration.

7. The decoy of claim 1, wherein said decoy resembles a bird.

8. The decoy of claim 7, wherein said bird is a waterfowl.

9. The decoy of claim 1, further comprises an attachable anchor.

10. The decoy of claim 1, wherein said pedestal further comprises a slot for attachment with a carrying apparatus.

* * * * *